United States Patent
Mestha et al.

(10) Patent No.: US 9,066,054 B2
(45) Date of Patent: Jun. 23, 2015

(54) IMAGE INDEXED RENDERING OF IMAGES FOR TUNING IMAGES FROM SINGLE OR MULTIPLE PRINT ENGINES

(75) Inventors: Lalit Keshav Mestha, Fairport, NY (US); Sohail A. Dianat, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 1457 days.

(21) Appl. No.: 12/199,392

(22) Filed: Aug. 27, 2008

(65) Prior Publication Data

US 2009/0296110 A1 Dec. 3, 2009

Related U.S. Application Data

(60) Provisional application No. 61/056,189, filed on May 27, 2008.

(51) Int. Cl.
| | |
|---|---|
| *G06F 15/00* | (2006.01) |
| *H04N 1/60* | (2006.01) |
| *H04N 1/00* | (2006.01) |
| *H04N 1/56* | (2006.01) |
| *G06K 1/00* | (2006.01) |

(52) U.S. Cl.
CPC .......... *H04N 1/6072* (2013.01); *H04N 1/00957* (2013.01); *H04N 1/56* (2013.01); *H04N 2201/0082* (2013.01); *H04N 2201/3256* (2013.01)

(58) Field of Classification Search
None
See application file for complete search history.

(56) References Cited

U.S. PATENT DOCUMENTS

| | | | |
|---|---|---|---|
| 7,016,061 B1 * | 3/2006 | Hewitt | 358/1.15 |
| 7,079,686 B2 * | 7/2006 | Ahmed et al. | 382/176 |
| 7,680,341 B2 | 3/2010 | Perronnin | |
| 7,756,341 B2 | 7/2010 | Perronnin | |
| 7,768,682 B2 | 8/2010 | Mestha et al. | |
| 7,773,222 B2 | 8/2010 | Mestha | |
| 7,864,320 B2 | 1/2011 | Bonino et al. | |
| 7,933,454 B2 | 4/2011 | Bressan et al. | |

(Continued)

FOREIGN PATENT DOCUMENTS

WO WO2008-040810 * 4/2008

OTHER PUBLICATIONS

Kramer, "Nonlinear Principal Component Analysis Using Autoassociative Neural Networks", AIChE Journal, Feb. 1991, vol. 37, No. 2, pp. 233-243.*

(Continued)

*Primary Examiner* — Quang N Vo
(74) *Attorney, Agent, or Firm* — Fay Sharpe LLP

(57) ABSTRACT

A system and method for rendering an image provide for segmenting the image into a plurality of segments based on image content and, for each identified segment, identifying a rendering profile from a set of rendering profiles. The rendering profile may include a look up table for converting pixels from a first color space, such as a device independent color space, e.g., RGB, to second color space, such as a device dependent color space, e.g., CMYK. The identified rendering profile is applied to the respective segment and the segments to which the profiles have been applied are combined into a print job for rendering on print media by an associated color output device or otherwise output. The system allows different segments in the image to be processed through different rendering profiles most suited to the objects that the segments contain.

25 Claims, 8 Drawing Sheets

(56) References Cited

U.S. PATENT DOCUMENTS

| | | | |
|---|---|---|---|
| 7,961,322 B2 | 6/2011 | Skinner et al. | |
| 8,009,921 B2 | 8/2011 | Csurka | |
| 8,014,027 B1* | 9/2011 | Kulkarni et al. | 358/1.9 |
| 8,094,947 B2 | 1/2012 | Marchesotti | |
| 8,111,923 B2 | 2/2012 | Csurka et al. | |
| 8,159,715 B2 | 4/2012 | Mestha et al. | |
| 2002/0097408 A1* | 7/2002 | Chang et al. | 358/1.6 |
| 2002/0172419 A1 | 11/2002 | Lin et al. | |
| 2003/0080974 A1* | 5/2003 | Grosvenor et al. | 345/622 |
| 2003/0081842 A1* | 5/2003 | Buckley | 382/233 |
| 2003/0108250 A1* | 6/2003 | Luo et al. | 382/263 |
| 2004/0190067 A1* | 9/2004 | Owen | 358/2.1 |
| 2005/0008255 A1* | 1/2005 | Aiso | 382/284 |
| 2005/0047656 A1* | 3/2005 | Luo et al. | 382/167 |
| 2005/0073719 A1* | 4/2005 | Amela et al. | 358/1.18 |
| 2005/0088675 A1* | 4/2005 | Nagoshi et al. | 358/1.9 |
| 2005/0111017 A1* | 5/2005 | Takahashi et al. | 358/1.9 |
| 2006/0285135 A1* | 12/2006 | Mestha et al. | 358/1.9 |
| 2007/0005356 A1 | 1/2007 | Perronnin | |
| 2007/0258648 A1 | 11/2007 | Perronnin | |
| 2008/0003547 A1 | 1/2008 | Woolfe et al. | |
| 2008/0007749 A1 | 1/2008 | Woolfe | |
| 2008/0037069 A1 | 2/2008 | Mestha et al. | |
| 2008/0068641 A1 | 3/2008 | Dance et al. | |
| 2008/0069456 A1 | 3/2008 | Perronnin | |
| 2008/0144891 A1* | 6/2008 | Hwang et al. | 382/118 |
| 2008/0317358 A1 | 12/2008 | Bressan et al. | |
| 2009/0009766 A1 | 1/2009 | Bonino et al. | |
| 2009/0086290 A1* | 4/2009 | Ming et al. | 358/501 |
| 2009/0092325 A1* | 4/2009 | Brown Elliott et al. | 382/232 |
| 2009/0141971 A1* | 6/2009 | Pan | 382/162 |
| 2009/0185230 A1 | 7/2009 | Mestha et al. | |
| 2009/0208118 A1 | 8/2009 | Csurka | |
| 2009/0232409 A1 | 9/2009 | Marchesotti | |
| 2009/0290794 A1 | 11/2009 | Marchesotti | |
| 2009/0290807 A1 | 11/2009 | Marchesotti | |
| 2009/0296085 A1 | 12/2009 | Mestha | |
| 2009/0296091 A1 | 12/2009 | Skinner et al. | |
| 2009/0296107 A1 | 12/2009 | Mestha et al. | |
| 2009/0296108 A1 | 12/2009 | Gil et al. | |
| 2009/0296110 A1 | 12/2009 | Mestha et al. | |
| 2009/0299905 A1 | 12/2009 | Mestha et al. | |
| 2010/0014776 A1 | 1/2010 | Marchesotti | |
| 2010/0040285 A1 | 2/2010 | Csurka et al. | |
| 2010/0201997 A1* | 8/2010 | Has | 358/1.9 |
| 2011/0064302 A1* | 3/2011 | Ma et al. | 382/159 |

OTHER PUBLICATIONS

U.S. Appl. No. 60/978,737.*
U.S. Appl. No. 61/025,039.*
A.Bosch, et al., Using Appearance and Context for Outdoor Scene Object Classification, In *ICIP*, 2005.
A.Levin, et al., Learning to Combine Bottom-Up to Top-Down Segmentation, *ECCV*, 2006.
A.Yezzi, et al., A Fully Global Approach to Image Segmentation Via Coupled Curve Evolution Equations, *Journal of Visual Communication and Image Representation*, vol. 13, No. ½, pp. 195-216, Mar./Jun. 2002.
B.Krishnapuram, et al., Sparse Multinomial Logistic Regression: Fast Algorithms and Generalization Bounds, *IEEE PAMI*, 27(6):957-968 (2005).
B.Liebe, et al., Combined Object Categorization and Segmentation with an Implicit Shape Model, In *ECCV'04 Workshop on Statistical Learning for Computer Vision*, May 2004.
B.Russell, et al., Using Multiple Segmentations to Discover Objects and Their Extent in Image Collections, In *CVPR*, 2006.
D.Comaniciu, et al., Mean Shift: A Robust Approach Toward Feature Space Analysis, *IEEE Trans. Pattern Anal. Machine Intell.*, 24, 603-619, 2002.
D.Larlus, et al., Category Level Object Segmentation—Learning to Segment Objects with Latent Aspect Models, *VISAPP*, (2), 2007.

D.Lowe, Distinctive Image Features from Scale-Invariant Keypoints, *IJCV*, 60(2):91-110 (2004).
D.Lowe, Object Recognition from Local Scale-Invariant Features, In *ICCV*, 1999.
E.Borenstein, et al., Combining Top-Down and Bottom-Up Segmentation, In *CVPR*, 2004.
F.Perronnin, et al., Adapted Vocabularies for Generic Visual Categorization, In *ECCV*, 2006.
F.Perronnin, et al., Fisher Kernels on Visual Vocabularies for Image Categorization, In *CVPR*, 2007.
G.Csurka, et al al., Visual Categorization with Bags of Keypoints, *ECCV Intl. Workshop on Statistical Learning in Computer Vision*, Prague, 2004.
G.Woolfe, Natural Language Color Editing, *Annual Meeting of the Inter-Society Color Council (ISCC)*, 2007.
H.D.Cheng, et al., Color Image Segmentation: Advances & Prospects, *Pattern Recognition*, vol. 34, No. 12, pp. 2259-2281, 2001.
H.Fu., et al., Region Based Visual Object Categorization Using Segment Features and Polynomial Image Modeling, *LIRIS*, UMR 5205 CNRS, 2008.
http://www.caip.rutgers.edu/riul/research/code/EDISON/index/html (2003).
J.Shi, et al., Normalized Cuts and Image Segmentation, *PAMI*, vol. 22, No. 8, 2000.
J.Shotton, et al., Textonboost: Joint Appearance, Shape and Context Modeling for Multi-Class Object Recognition and Segmentation, In *ECCV*, 2006.
J.Sivic, et al., Video Google: A Text Retrieval Approach to Object Matching in Videos, In *Proc. of the Ninth IEEE Intl. Conference on Computer Vision (ICCV)*, 2003.
J.Verbeek, et al., Region Classification with Markov Field Aspects Models, In *CVPR*, 2007.
J.Verbeek, et al., Scene Segmentation with CRFs Learned from Partially Labeled Images, In *NIPS*, 2007.
J.Winn, et al., Locus: Learning Object Classes with Unsupervised Segmentation, In *ICCV*, 2005.
J.Winn, et al., The Layout Consistent Random Field for Recognizing and Segmenting Partially Occluded Objects, In *CVPR*, 2006.
K.Mikolajczyk, et al., A Comparison of Affine Region Detectors, *Intl. J. Computer Vision*, vol. 65, No. ½(2005).
K.Mikolajczyk, et al., A Performance Evaluation of Local Descriptors, *IEEE Transactions on Pattern Analysis & Machine Intelligence*, vol. 27, No. 10 (2005).
K.Mikolajczyk, et al., An Affine Invariant Interest Point Detector, In *ECCV*, 2002.
L.Cao, et al., Spatially Coherent Latent Topic Model for Concurrent Segmentation and Classification of Objects and Scenes, In *ICCV*, 2007.
L.DeLathauwer, et al., A Multilinear Singular Value Decomposition, *SIAM Jour. on Matrix An. and Applic.*, vol. 21, pp. 1253-1278, 2000.
L.Yang, et al., Multiple Class Segmentation Using a Unified Framework Over Mean-Shift Patches, In *CVPR*, 2007.
M.P.Kumar, et al., Obj Cut, In *CVPR*, 2005.
M.Rousson, et al., Prior Knowledge, Level Set Representations & Visual Grouping, *Intl. Journal of Computer Vision*, vol. 76, No. 3, pp. 231-243, Mar. 21, 2008.
N.Xu, et al., Object Segmentation Using Graph Cuts Based Active Contours, In *IEEE Computer Society Conference on Computer Vision and Pattern Recognition*, 2003.
S.Kumar, et al., A Hierarchical Field Framework for Unified Context-Based Classification, In *ICCV*, 2005.
T.S.Jaakkola, et al., Exploiting Generative Models in Discriminative Classifiers, *Proceedings of the 1998 Conference on Advances in Neural Information Processing Systems II*, pp. 487-493, 1999.
X.He, et al., Multiscale Conditional Random Fields for Image Labeling, In *CVPR*, 2004.
Y.Boykov, et al., Computing Geodesics and Minimal Surfaces Via Graph Cuts, In *IEEE Intl. Conference on Computer Vision (ICCV)*, pp. 26-33, Oct. 2003.
Z.Tu, et al., Image Parsing: Unifying Segmentation, Detection, and Recognition, *IJCV*, Marr Prize Issue, 2005.
K.Diamantaras, et al., Principal Component Neural Networks, Chapter 3, New York: Wiley, 1994.

* cited by examiner

IMAGE INDEXED RENDERING OF IMAGES FOR TUNING IMAGES FROM SINGLE OR MULTIPLE PRINT ENGINES

This application claims the priority of U.S. Provisional Application Ser. No. 61/056,189, filed May 27, 2008, the disclosure of which is incorporated herein in its entirety by reference.

CROSS REFERENCE TO RELATED PATENTS AND APPLICATIONS

The following copending applications, the disclosures of which are incorporated in their entireties by reference, are mentioned:

U.S. application Ser. No. 12/017,746, filed Jan. 22, 2008, entitled METHOD AND APPARATUS FOR OPTIMUM BLACK COMPONENT DETERMINATION FOR GRAY COMPONENT REPLACEMENT, by Mestha, et al.;

U.S. application Ser. No. 12/127,643, filed May 27, 2008, entitled METHOD, APPARATUS AND SYSTEMS TO RETRIEVE GCRS FROM HISTORICAL DATABASE, by Mestha, et al.;

U.S. Provisional Patent Application Ser. No. 61/056,095, filed May 27, 2008, entitled METHOD TO MINIMIZE INSTRUMENT DIFFERENCES IN COLOR MANAGEMENT FUNCTIONS, by Bonino, et al.;

U.S. Provisional Application Ser. No. 61/056,102, filed May 27, 2008, and application Ser. No. 12/194,602, filed on Aug. 20, 2008, both entitled UV ENHANCED FULL WIDTH ARRAY SCANNING SPECTROPHOTOMETER, by Mestha;

U.S. Provisional Patent Application Ser. No. 61/056,090, filed May 27, 2008, entitled METHOD FOR CONDITIONAL APPLICATION OF COLOR MEASUREMENT ERROR COMPENSATION IN SPECTRAL SENSORS, by Skinner, et al.;

U.S. Provisional Patent Application Ser. No. 61/056,737, filed on May 27, 2008, entitled ACCURATE CONTENT-BASED IMAGE INDEXING AND RETRIEVAL SYSTEM, by Mestha, et al.;

U.S. application Ser. No. 12/127,719, filed May 27, 2008, entitled COOPERATIVE NEIGHBOR PRINTING SYSTEM PROFILE METHODS AND SYSTEMS, by Gil, et al.;

U.S. application Ser. No. 12/127,649, filed May 27, 2008, entitled A WEB ENABLED COLOR MANAGEMENT SERVICE AND METHOD, by Mestha, et al.;

U.S. application Ser. No. 11/767,739, filed Jun. 25, 2007, entitled CLASS-BASED IMAGE ENHANCEMENT SYSTEM, by Marco Bressan, et al.;

U.S. application Ser. No. 12/033,434, filed on Feb. 19, 2008, entitled CONTEXT DEPENDENT INTELLIGENT THUMBNAIL IMAGES, by Gabriela Csurka; and U.S. application Ser. No. 12/191,579, filed Aug. 14, 2008, entitled SYSTEM AND METHOD FOR OBJECT CLASS LOCALIZATION AND SEMANTIC CLASS BASED IMAGE SEGMENTATION, by Czurka, et al.

BACKGROUND

The exemplary embodiment relates to image rendering and finds particular application in connection with a content-based profile selection method.

Color image rendering is important for accurate and consistent color reproduction. Color device profiles are commonly employed to transform color image data formatted for one device color space to color image data formatted for another device color space. For example, an International Color Consortium (ICC) workflow calls for converting color image data formatted in red-green-blue (RGB) color space for a color monitor to a device independent color space called profile connection space (PCS), and then into color image data formatted in CMYK space for a color printer.

One-dimensional Tone Reproduction Curves (TRCs) are widely used in digital imaging as a means for compensating for non-linearities introduced by an individual imaging device. In general, the same TRC is used for each pixel in an image. Conventionally, one TRC is used for each of the colorants, i.e., four TRCs in the case of a CMYK process color marking device, a single TRC for a monochrome (single color) device. The TRCs can be periodically refined by printing calibration patches on the imaging device, comparing the measured color of each of the calibration patches with that of respective reference colors, and modifying the TRCs to achieve a closer correlation between the printed calibration patches and reference colors. More recently, multidimensional look up tables (LUTs) replace the single TRCs which are developed and updated frequently, allowing colorant interactions to be taken into consideration.

Recently developed control based advanced profiling approaches build a single destination profile per each halftone screen (such as for 150 dpi (dots per inch), 175 dpi, 200 dpi, etc. screens) that maps the RGB or CMYK images to device CMYK space for rendering on a process color marking engine. These approaches use the ICC image path to apply the transformation to each pixel and process the images prior to rendering in the print engine. The profile transformation is a multi-dimensional look up table (LUT) with finite number of nodes in which CMYK values are pre-computed. Colors which are not in the LUT nodes are transformed to CMYK using interpolation.

Using one profile for the whole image creates limitations for mapping out-of-gamut colors, inversion, gray component replacement (GCR), filtering etc, and hence the output may not result in the best color consistency and reproduction in one or across multiple engines. In some existing methods, source profiles are embedded inside the incoming image. However, the profiles cannot be independently tuned for different parts of the image or adjusted depending on the marking engine's reproducible gamut.

INCORPORATION BY REFERENCE

The following reference, the disclosure of which is incorporated herein in its entirety by reference, is mentioned:

U.S. Pub. No. 2008/0037069, entitled METHOD FOR SPATIAL COLOR CALIBRATION USING HYBRID SENSING SYSTEMS, by Mestha, et al. discloses a method and system for color calibration of a color output device which spectrophotometrically measures at a test target including a preselected test color value. The method includes producing a first output image with the device in response to an input signal from a test image. The first test image includes at least one preselected color. The method further includes measuring, with a first sensor the image corresponding to the preselected color. The first sensor produces a first output indicating color information for at least the preselected color. The method further includes producing a multi-dimensional LUT of the device representative of the color information including the at least one preselected color and producing a second output image with the device, wherein the second output image includes the at least one preselected color located at a plurality of spatial locations in the second output image. The method further includes measuring with a second sensor the image at the plurality of spatial locations corresponding to the preselected color of the second output image, the second sensor producing a second output indicating reflectance information for at least the preselected color at the plurality of spatial locations, and determining an error between the measured color of the one preselected color at a preselected pixel location and the reflectance information at other pixel locations within the plurality of spatial locations corresponding to the preselected color, and adjusting the multi-dimensional LUT to minimize the spatial uniformity errors at the other pixel locations, thus calibrating the device color output spatially whereby the device expeditiously produces a more uniform color over a calibrated output image.

BRIEF DESCRIPTION

In accordance with one aspect of the exemplary embodiment a method of rendering an image includes segmenting the image into a plurality of segments based on image content. For each identified segment, the method includes identifying a rendering profile from a set of rendering profiles. The rendering profile is applied to the respective segment and the segments to which the profiles have been applied are combined into a print job.

In accordance with another aspect of the exemplary embodiment, a system for rendering an image is provided. The system includes memory which stores instructions for segmenting the image into a plurality of segments based on image content, for each identified segment, identifying a rendering profile from a set of rendering profiles, applying the rendering profile to the respective segment, and combining the segments to which the profiles have been applied into a print job. A processor executes the instructions.

In accordance with another aspect of the exemplary embodiment, a printing system includes a color output device which renders print jobs on print media and a content-based rendering system in communication with the color output device which receives an image to be rendered in a first color space and generates a print job in a second color space suitable for rendering on the color output device. The rendering system includes memory which stores a plurality of rendering profiles, including a first rendering profile associated with a first object class and at least a second rendering profile associated with a second object class, the object classes being characterized by a set of stored features extracted from training images. The rendering system further includes a segmentation component which identifies a plurality of localized segments in the image, a rendering profile identifier which for each identified segment, extracts at least one feature from the identified segment, assigns the segment to an object class based on a comparison of the extracted feature with the stored features, and assigns a rendering profile based on the assigned object class. The rendering system further includes a rendering profile applicator, which for each identified segment, applies the assigned rendering profile to pixels in the segment to convert the pixels from the first color space to the second color space, the combined converted pixels of the segments forming a print job.

DETAILED DESCRIPTION

Aspects of the exemplary embodiment relate to a system and method for content-based image rendering in which different segments of an image are processed differently according to their image content.

For example, consider an image containing three segments: each segment encompassing a different object, such as a building, grass, and blue sky. This image may be best reproduced if at least three different profile LUTs are used, one for each of the three different segments of the image. That is, one rendering profile LUT for the grass segment, one for the blue sky, and one for the building. On an even more refined level, the rendering of the building may be optimal if different segments of the building are rendered according to their content. As another example, consider an image with a human subject having several key colors such as a bluish background, a red shirt, a green skirt, and skin color or hair. This image can be easily segmented using color segmentation and each segment can be rendered differently for improved color reproduction.

As used herein the term "rendering profile" encompasses any look up table (LUT), algorithm, or combination or multiple thereof, or the like, which relates input color values (such as device independent color values) to output color values (such as CMYK or other device dependent color values) in the same or a different color space. For convenience, the term LUT is frequently used herein, with the understanding that other types of data structure are also contemplated.

As used herein, a "segment" comprises a generally contiguous region of an image which is distinguishable, by its content, from one or more other segments which make up the image.

In various aspects, an image indexed rendering approach uses selectively different profiles based on image content. For example, an input image may have pixels expressed in an RGB color space. For each input pixel of a first segment of the image, the three input colors (RGB) are used to address a first multidimensional LUT where interpolation is used for fractional distances between node values, to generate an output pixel expressed in CMYK color space. Likewise, for each input pixel of a second segment of the image, the three input colors are used to address a second multidimensional LUT to generate an output pixel expressed in the CMYK color space.

Figure 1:
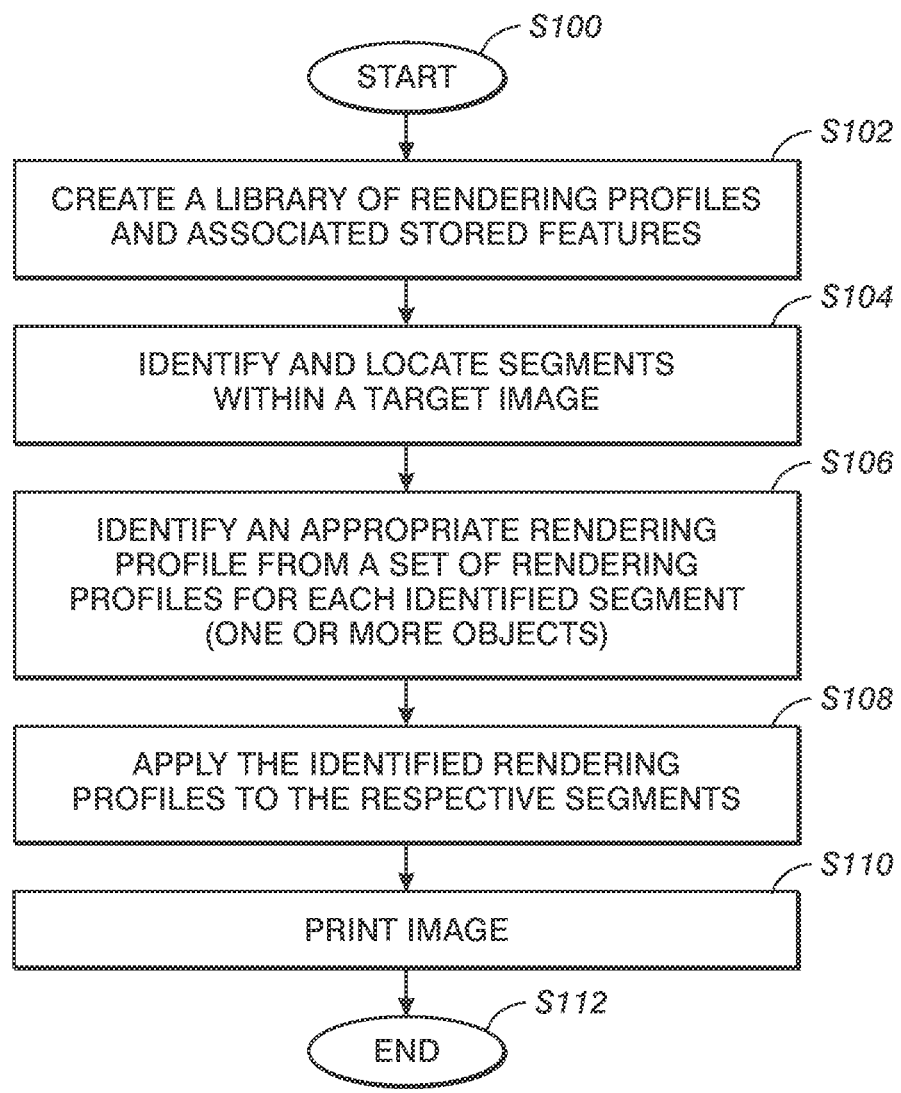
FIG. 1 is a flow diagram illustrating an exemplary method of content based image rendering.

The exemplary method is illustrated in FIG. 1 and begins at S100. The method may include four main steps:

S102: Creation of a library of stored rendering profiles (LUTs). The library is in the form of a database of different profiles generated for different object classes. This step may be performed by tuning the parameters of the rendering profiles a priori with right inversion, GCR and gamut mapping algorithms appropriate for particular types of image segments. Additionally features extracted from segments in training images are stored and linked to the most appropriate LUT for the segment from which they were generated. This step may be performed offline.

S104: Identification of segments within a target image to be rendered. This step may include the use of a fast and efficient image segmentation algorithm that divides the color image into a few (e.g., about 10 or less) meaningful segments. The algorithm retains the coordinates of each identified image segment for further processing. To achieve fast segmentation, the resolution of the image may be lowered, e.g., by using wavelet decomposition, before segmentation.

S106: Identifying an appropriate rendering profile from the set of G rendering profiles in the library, where G can be for example, at least 2 and in some embodiments, three or more, such as up to about 10. In one embodiment, an efficient and fast image indexing algorithm based on nonlinear principal component analysis (NLPCA) may used for identifying an appropriate rendering profile from the library for each identified segment within the image. For example, text and images may be assigned different rendering dictionaries for improved color reproduction. NLPCA improves the probability of correct indexing as compared with conventional PCA. NLPCA can be used to generate feature vectors for different segments, which in turn improves accuracy of segment matching with profiles. In another embodiment, linear principal component analysis may be used instead of NLPCA.

In another embodiment, e.g., when the number of segments is limited to a handful, step S106 can include a simple indexing and search approach. For example, a segment comprising sky (output of step S104) is processed with a profile specific to sky objects in step S106. The rest of the image may be processed with a general purpose custom destination profile. This avoids the need for application of NLPCA techniques.

S108: Application of the identified rendering profiles to render different image segments, and merging them to create a print ready job.

Steps S104-S108 are applied during run time image/job processing (e.g., during raster image processing (RIPing) and prior to printing.

At S110, the print job comprising the differently-treated image segments is printed. The method ends at S112.

Steps S104-S108 of the exemplary method may be embodied in a computer program product which stores instructions, which when executed by a computer, perform these steps of the exemplary method. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, memory stick, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 1, can be used to implement the method for segment-based rendering of an image.

Figure 2:
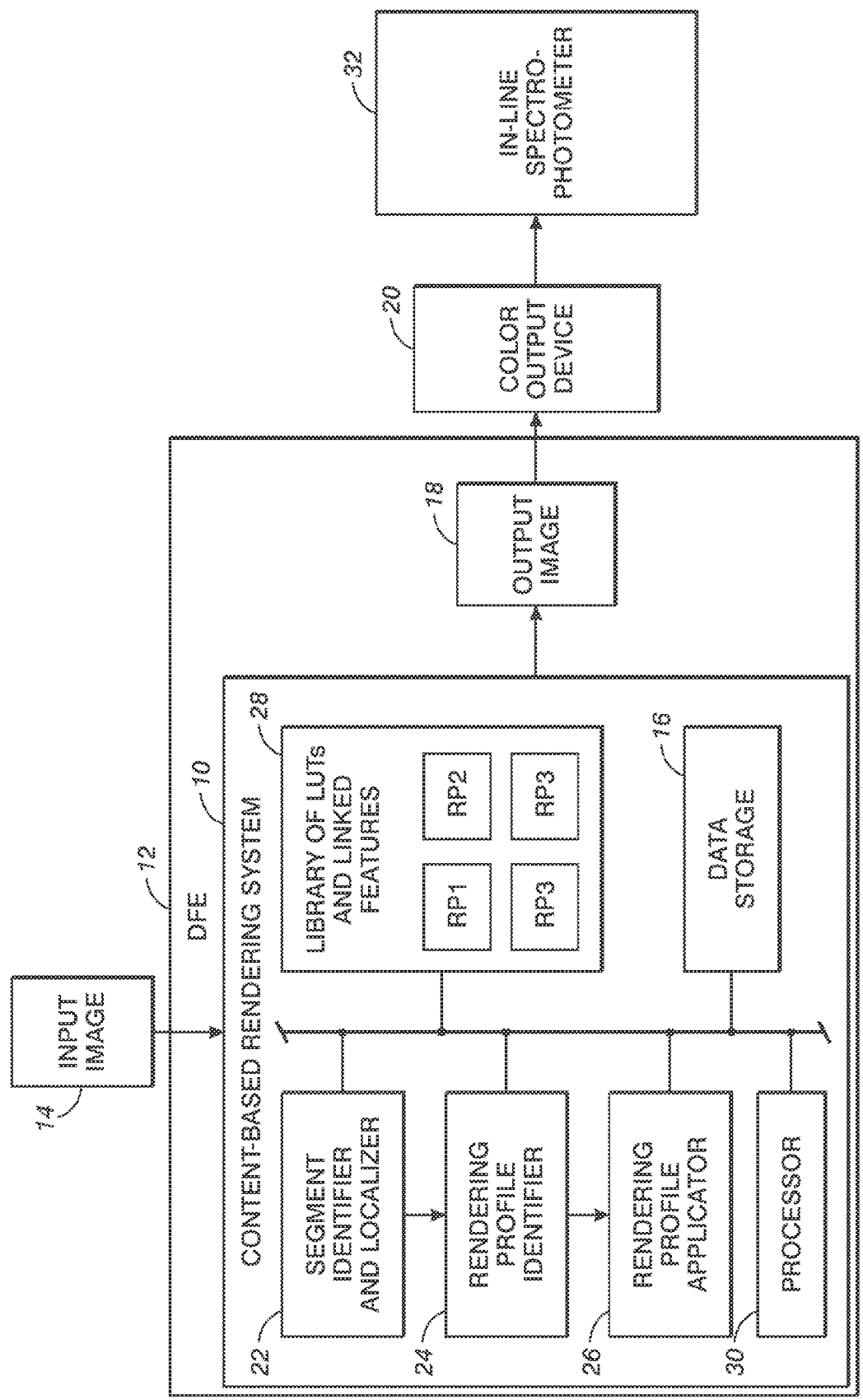
FIG. 2 illustrates an exemplary rendering system hosted by a printer.

FIG. 2 illustrates an exemplary content-based rendering system 10 which may be used for performing the method of FIG. 1. The system 10 may be hosted by any suitable computing device 12 with processing capability and memory, such as the digital front end (DFE) of a printer, such as a digital printing apparatus, copier, or multifunction device. Alternatively, the host computer is remote from the printer, e.g., may be hosted by the public site of a print shop or and linked to the printer by suitable wired or wireless links. A digital image 14 to be rendered is input to the system 10 and may be stored in data memory 16 during processing. A content-based converted image 18 which has been processed by the system 10 is output and (optionally after further processing) is sent to a color output device 20. In the exemplary embodiment, the color output device is a color marking engine of a printer, which renders the image by printing on print media, such as paper, using colorants, such as inks or toners. In other embodiments, the color output device 20 may be a display device, such as an LCD screen or the like.

The image 14 can be input from any suitable image source, such as a workstation, database, memory storage device, such as a disk, or the like. Typically, each input digital image 14 includes image data for an array of pixels forming the image. The image data may include colorant values, such as grayscale values, for each of a set of color separations, such as L*a*b* or RGB, or be expressed in another other color space in which different colors can be represented. In general, "grayscale" refers to the optical density value of any single image data channel, however expressed (e.g., L*a*b*, RGB, YCbCr, etc.). The images may be photographs, video images, combined images which include photographs along with text, and/or graphics, or the like. The images may be received in any suitable form recognized by the system, such as JPEG, GIF, JBIG, BMP, TIFF or other common file format used for images, and which may optionally be converted to another suitable format prior to processing. Input images may be stored in data memory 16 during processing. Multiple images may be submitted together as part of a print job. Each input image may correspond to a page of the printed print job and may be separately segmented.

The system 10 includes various processing components, which may be embodied as hardware and/or software, including a segment identifier and localizing component 22, a rendering profile identifying component 24, and a rendering profile applying component 26. Memory, accessible to the processing components, stores a LUT database 28 which stores a plurality of rendering profiles (RP1, RP2, RP3, RP4 etc.), each in the form of a multidimensional LUT, set of LUTs, or other data structure. One of the rendering profiles RP1 may be a generic LUT which is to be used when no other applicable rendering profile is identified. Each of the other rendering profiles RP2, RP3, RP4 may be associated with a respective object class, selected from a set of predefined object classes.

The processing components 22, 24, 26, may be in the form of software stored in main memory of the computer 12 and which are executable by a processor 30 with access to the memory. The output device 20 and/or system 10 may be linked to a spectrophotometer 32, or other calibration system, which evaluates the rendered images and updates the stored rendering profiles (RP1, RP2, RP3, RP4 etc) if appropriate.

The main memory and memory 16 may be separate or combined and may represent any type of computer readable medium such as random access memory (RAM), read only memory (ROM), magnetic disk or tape, optical disk, flash memory, or holographic memory. In one embodiment, the memory comprises a combination of random access memory and read only memory. In some embodiments, the processor 30 and memory may be combined in a single chip. The computer 12 may include a network interface (not shown), which allows the computer to communicate with other devices via a computer network, such as a local area network (LAN) or wide area network (WAN), or the Internet.

Further details of the method and system will now be provided.

Figure 3:
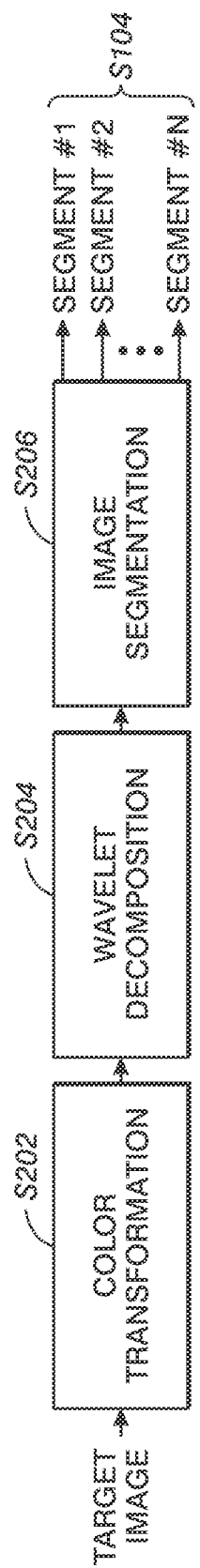
FIG. 3 illustrates an image segmentation step of the exemplary method of FIG. 1.

FIG. 3 is a block diagram of substeps in the step for segmentation of the target image 14 (S104).

At S202, a color transformation may be performed. For example, all the image segments are transformed to a unified color space such as RGB, Lab, or $YC_bC_r$ color space.

At S204, wavelet decomposition, or other method is optionally used to reduce the image resolution for fast segmentation.

At S206, the target image is segmented using a suitable fast segmentation algorithm. A suitable algorithm which may be used is described in H. D. Cheng, X. H. Jiang, Y. Sun and J. L. Wang, "Color image segmentation: advances & prospects," Pattern. Recognition, Vol. 34, No. 12, pp. 2259-2281, 2001. Other methods of identifying segments in images are described, for example in U.S. Pub. No. 2007/0005356, entitled GENERIC VISUAL CATEGORIZATION METHOD AND SYSTEM, by Florent Perronnin and U.S. Pub. No. 2008/0069456, entitled BAGS OF VISUAL CONTEXT-DEPENDENT WORDS FOR GENERIC VISUAL CATEGORIZATION.

The segmentation (S206) may be performed at the same resolution and same color space as in the feature extraction part (described later). For a web/grid-enabled color management service, the segmentation algorithm can be relatively accurate, although high accuracy may influence the computational cost unduly. Above mentioned U.S. patent application Ser. No. 12/127,649, filed May 27, 2008, entitled A WEB ENABLED COLOR MANAGEMENT SERVICE SYSTEM AND METHOD, by Mestha, et al., describes a web-enable color management system which may be employed in the present method.

Once the image is segmented, an upsampling technique is used to increase the resolution of the image segments to their original resolution. The segmentation divides the image into N segments (N=1, 2 . . . j, . . . N) that will be rendered differently. Each segment may correspond to an object in the image or a group of objects and be identified by pixel locations of pixels within or bordering the segment.

Figure 4:
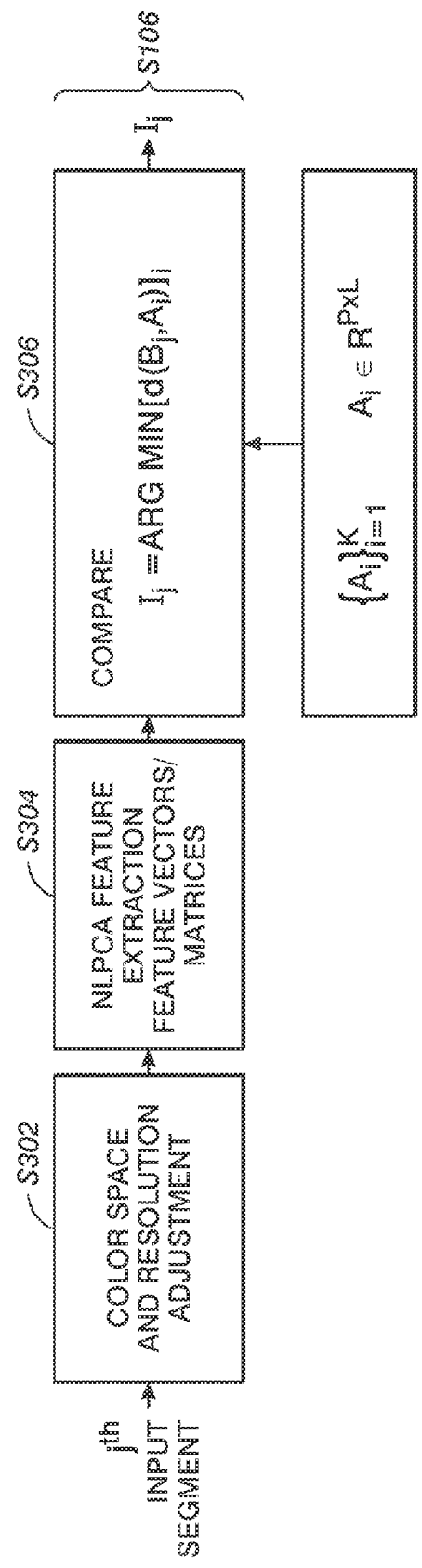
FIG. 4 illustrates a profile (or rendering LUT) selection step of the exemplary method.

FIG. 4 illustrates substeps of S106, in which a fast and efficient image indexing algorithm based on NLPCA is used for finding and selecting the right rendering profile LUT from the set of G rendering profiles, for each segment N1, N2, N3, etc. within the image 14 which has been identified in step S104.

Once the target image 14 is segmented into N segments, each segment may be converted to a selected resolution, e.g., using wavelet decomposition (S302). For each segment j, NLPCA feature vectors (or matrices) are computed (S304). For monochromic images, feature vectors can be generated and for color images, feature matrices can be generated. The feature vectors may simply be derived from a concatenation of the pixel colorant values (optical densities) of the pixels in the resolution adjusted segment j, which in the case of multicolor images, become the columns of a matrix. The vectors/matrices can then be reduced to manageable number of elements using PCA or NLPCA.

For example, let the feature matrix (or vector) for the $j^{th}$ segment be denoted by $B_j$.

To identify the optimal rendering profile for the $j^{th}$ segment (S306), matrix $B_j$ is compared to a database of K feature matrices $\{A_i\}_{i=1}^{K}$ (where $A_i \in R^{P \times L}$, and R represents the set of all real numbers, P represents the number of principal components, and L represents the number of color separations, e.g., 3 in the case of RGB). Based on the comparison, the nearest matrix $A_i$ is selected according to an appropriate distance metric denoted by $d(A_i, B_j)$. The distance metric used to compare the two feature matrices $A_i$ and $B_j$ can be the Frobenius norm, given by:

$$d(A_i, B_j) = \text{trace}[(A_i - B_j)^T (A_i - B_j)], \quad (1)$$

where T denotes the conjugate transpose and the trace of the matrix is the sum of its eigenvalues.

Other types of matrix norms such as a spectral norm or p norm may alternatively be used. The spectral norm of matrix A is the square root of the largest eigenvalue of the positive definite matrix $A^T A$. Another alternative is a weighted distance matrix, where the distance is weighted according to the color contents of the segment. In this case, the distance metric may be defined as:

$$d(A_i, B_j) = \text{trace}[(A_i - B_j)^T W_i^T W_i (A_i - B_j)], \quad (2)$$

The weights $W_i$ may be derived from the human visual system (HVS) or $\Delta E2000$ color difference formula. The selection of the number of segments N, metric for identifying an appropriate rendering profile, and the number of nonlinear principal components P are the primary parameters of the overall system and may be varied to optimize results for a particular application.

Nonlinear PCA (NLPCA) generally improves the probability of correct indexing as compared with conventional PCA. NLPCA is used to generate feature vectors for different image segments, which in turn improves accuracy of segment matching with the profiles. Two algorithms for this step are given by way of example. These and other PCA methods are described in Chapter 3 of Diamantaras, K. I., and S. Y. Kung, "Principal component neural networks," New York: WILEY-INTERSCIENCE, John Wiley & Sons, Inc., ISBN 0-471-05436-4, 1994 and in U.S. Pat. No. 5,749,020, entitled COORDINITIZATION OF TONE REPRODUCTION CURVE IN TERMS OF BASIS FUNCTIONS, by L. K. Mestha, et al., the disclosure of which is incorporated herein by reference in its entirety.

At S306, the index $I_j$ corresponding to the $j^{th}$ object is obtained. The index $I_j$ is found by identifying the database feature matrix $A_i$ which is closest to the feature matrix $B_j$ for the jth object. This index can be used to identify the right profile LUT.

Specifically, $I_j = \underset{i}{\text{argmin}}[d(B_j, A_i)]$

For $\{A_i\}_{i=1}^{K} A_i \in R^{P \times L}$ where $d(B_j, A_i)$, as previously noted, is the distance between the feature matrix $B_j$ for the jth object and a database feature matrix $A_i$.

Figure 5:
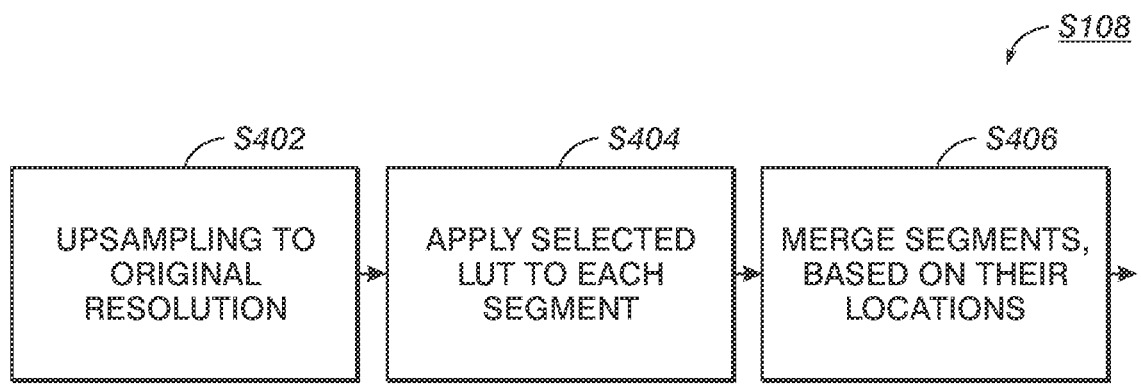
FIG. 5 illustrates a step of application of the right profile to the image segment of the exemplary method.

With reference to FIG. 5, step S108 includes application of the right profile, identified at S106, to the image segment and then merging the processed segments to form an image in device space for rendering. In this step, an upsampling technique is used to increase the resolution of the image segment to the original resolution (S402). Then the selected rendering LUT is applied to each segment to transform the segment to CMYK (S404). At S406, each processed segment is merged into a full image. This step involves the use of coordinates of the image segments from the output of step S104.

Figure 6:
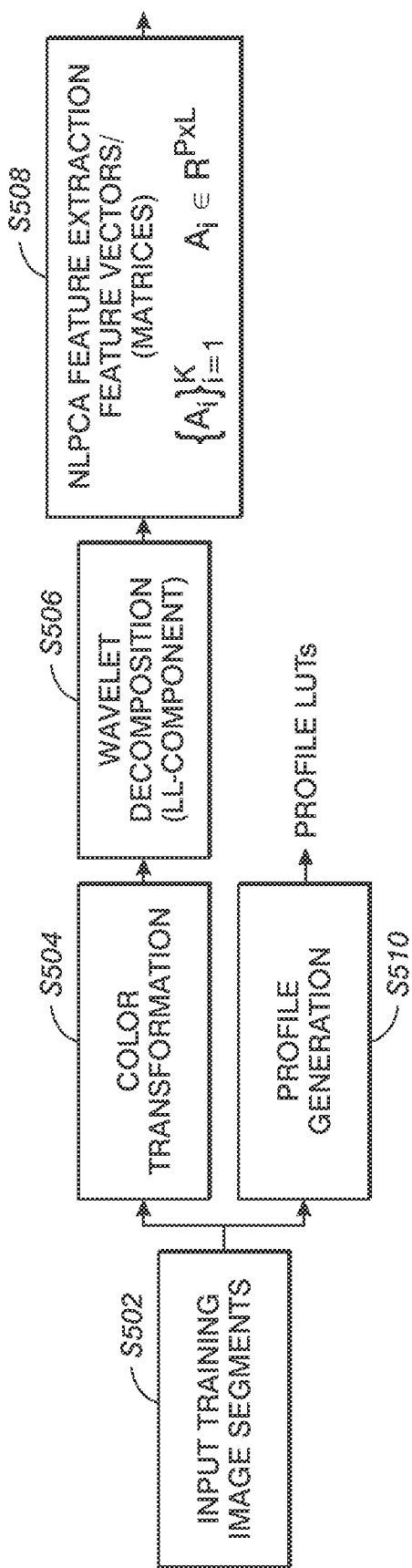
FIG. 6 illustrates a step of feature vector/matrix and profile creation of the exemplary method.

Returning now to the preliminary step S102, a library of profile LUTs and linked features (vectors/matrices) are created and stored. The rendering profiles can be created a priori or during run time with right inversion, GCR and gamut mapping algorithms. A set of training images may used to create an image segment database. FIG. 6 illustrates NLPCA feature vector/matrix and profile creation which may be performed in S102.

At S502, a set of training images is input.

At S504, a color transform may be performed on each training image in the set. For example, all the image segments are transformed to a unified color space such as RGB, Labor $YC_bC_r$ color space.

At S506, the resolution of each training image is changed to a fixed low resolution to reduce the computational time. A wavelet based decomposition algorithm is used to lower the resolution to a desired level before further processing of the input training images.

At S508, a feature vector/matrix can be generated for one or more segments of each training image.

At S510, a set of profiles G is generated for a set of object classes (such as text, sky, buildings, person, out of gamut segment, etc.). The features of those segments of the training image manually assigned to a particular object class are linked to the appropriate object class, and, consequently, to the respective rendering profile.

S508 may be performed using multiple snapshots of the same segment. Each snapshot is created by passing the segment through different affine and non-affine transformations such as translation, scaling, rotation, and shearing. NLPCA is used to generate feature vectors for different segments. NLPCA has shown to be more effective in dimensionality reduction and feature vector generation than linear PCA, especially when images are not linearly correlated. It exploits the nonlinear correlation between data samples and does not rely on the Gaussian assumption for optimality.

Segments such as texts, textures, vector data, raster data, images, etc., are generated using different affine and non-affine transformations and a database of these segments is formed. These segments are generally at different resolutions and may have different color space representations. Once all these training images have been converted to one resolution and one color space, the feature vectors are generated for monochromic images and feature matrices for color images, using the NLPCA algorithm. The columns of the feature matrix are the feature vectors corresponding to the three (or more) channels of a color image. These feature vectors are denoted by $A_i$, i=1, 2, . . . , K, where K is the number of segments in the database. Each feature $A_i$ is a P×L vector (matrix), where P is the number of nonlinear principal components and L=1 for a gray scale image and L=3 for an RGB color image. The number of principal components P is smaller than the number of segments in the database. Feature matrix extraction for RGB images is briefly explained below. The feature matrix has three columns. Each column is a feature vector generated using combinations of the three color channels.

Feature Matrix Extraction

Figure 7:
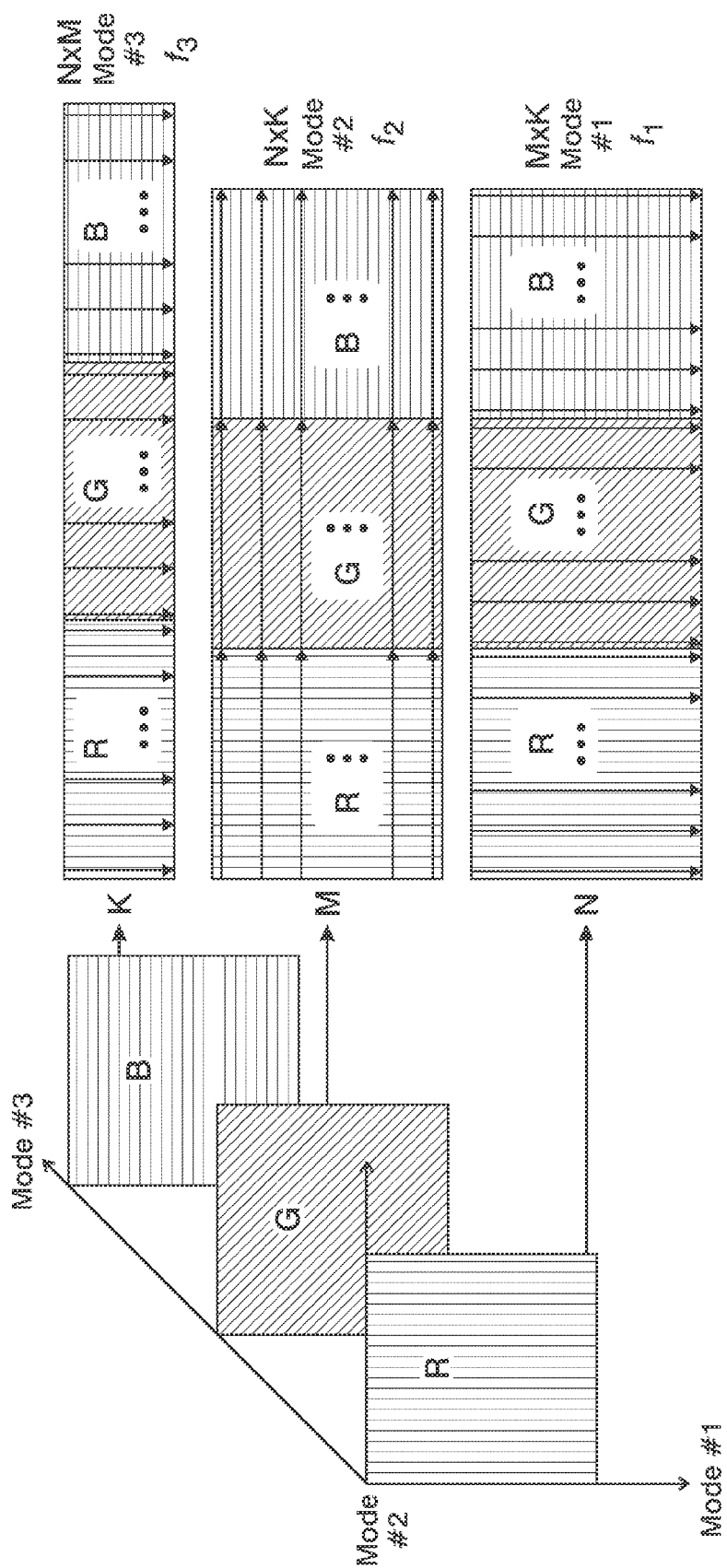
FIG. 7 illustrates modes of a tensor in a features extraction step.

The feature matrix of a colored image (in this case an image segment) is extracted using the NLPCA technique. Consider a multispectral image defined by the multidimensional data set (tensor) f of size N×M×K, where N and M are image dimensions and K is the number of spectral bands. For an RGB image, the number of spectral bands is three (K=3). The tensor f can be flattened into K modes $f_1, f_2, \ldots, f_K$ using techniques described in L. De Lathauwer, B. De Moor, and J. Vandewalle, "A multilinear singular value decomposition," SIAM Jour. on Matrix An. and Applic., vol. 21, pp. 1253-78 (2000). The construction of these modes for an RGB image is shown in FIG. 7. In this case, the three modes of the tensor f are three matrices. The sizes of the three matrices $f_1, f_2$ and $f_3$ are N×(MK), M×(NK), and K×(NM), respectively. Let the NLPCA based feature vectors corresponding to the three component images $f_1, f_2$ and $f_3$ which make up the input image (i.e., R image, G image, and B image) be $a_1, a_2$, and $a_3$, respectively. The feature matrix A of color image f is defined as:

$$A=[a_1 \vdots a_2 \vdots \hat{a}_3] \quad (3)$$

where $a_1 \in R^{P \times 1}, a_2 \in R^{P \times 1}$, and $\hat{a}_3 = [a_3^T 0 \ldots 0]^T \in R^{P \times 1}$.

Note that the $a_3$ vector is zero padded to increase its demotion to P.

Figure 8:
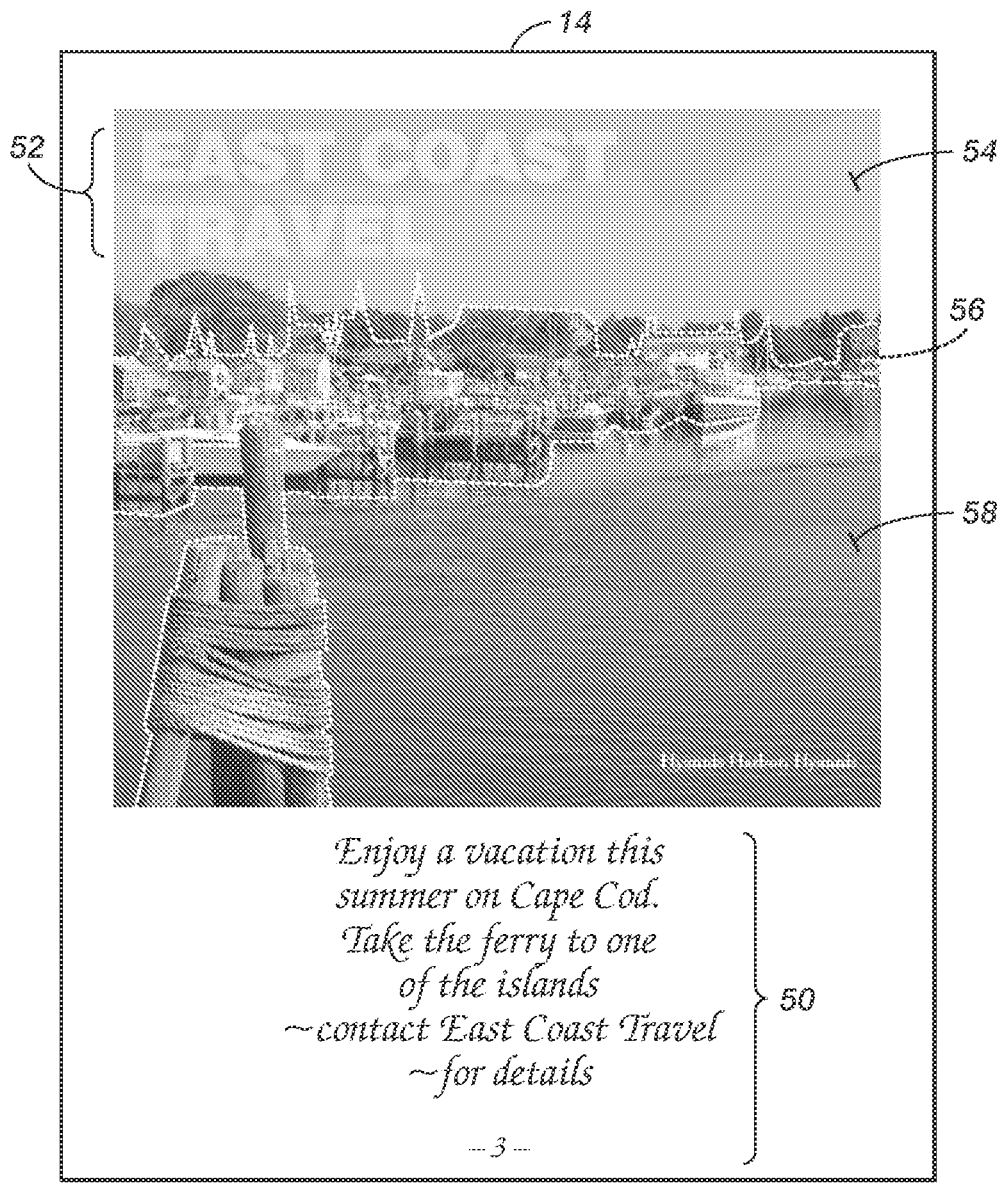
FIG. 8 illustrates an exemplary segmented image.

FIG. 8 illustrates an exemplary input image 14 in which various objects in the image have been identified as segments, such as a text object 50, a spot color segment 52, such as a company name or logo, which is out of gamut for the printer, and sky and building regions 54, 56 of a graphic object 58. Pixels of the text object 50 may be processed through a first LUT appropriate for monochrome text segments. Pixels of the sky region 54 may be processed using a second LUT appropriate for sky segments. Pixels of the building region 56 may be processed through a third LUT appropriate for buildings. The remainder of the graphic object 58 may be processed with a fourth LUT, which is a general graphic LUT used where no other graphic object class is assigned.

The image indexed rendering process thus described for color images provides several advantages. Since image segments are independently processed, it provides flexibility to perform gamut mapping of out-of-gamut colors to anywhere inside or on the gamut surface (i.e., to in-gamut colors). Also, in-gamut colors can be processed differently when compared to current profiling methods.

When number of segments is limited to few, step S106 can be replaced by a simple indexing and search approach. For example, a segment comprising sky is processed with a profile specific to a sky segment. The rest of the image is processed with a general purpose custom destination profile. Custom destination profiles may be specific to one or more of halftones, media and engine. In step S108, they are merged. In this way, the sophisticated NLPCA algorithm can be avoided.

This content-dependent rendering approach allows independent control of image segments where the right kind of processing can be applied to produce superior quality in digital production printers in image quality attributes such as chromatic details, smoothness, color contrast, etc. Specific segments can be processed with machine and segment specific profiles to achieve matching between different print engines.

The NLPCA approach enables the rendering of images to be more accurate when there is a large number of segments requiring different LUTs.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of rendering an image comprising:
providing a set of stored rendering profiles, each of the stored rendering profiles relating input color values to output color values, the set including rendering profiles for sky, buildings, and grass;
segmenting the image into a plurality of segments based on image content with a segmenting algorithm, which identifies segments selected from text object segments, out of gamut spot color segments, and segments that are sky, grass, or building regions of graphic objects, wherein the number of segments is about 10 or less;
for each identified segment which has been previously identified by the segmenting algorithm, identifying a rendering profile from the set of stored rendering profiles including, for each identified segment, identifying a feature of the segment and comparing the identified feature to a set of stored features extracted from training images, each of the stored features being linked to one of the set of rendering profiles, each identified feature being identified using nonlinear principal component analysis, and for segments of the image for which no stored feature is identified, identifying a general purpose custom destination profile;
for every identified segment, applying the identified rendering profile to the respective segment; and
combining the segments to which the rendering profiles have been applied into a print job.

2. The method of claim 1, wherein the segmentation includes identifying a set of segments in the image.

3. The method of claim 1, wherein the identifying of rendering profiles includes assigning a first rendering profile to a first segment of a graphics object and a second rendering profile to a second segment of a graphics object, the first and second rendering profiles being selected from the set of rendering profiles.

4. The method of claim 1, wherein the stored rendering profiles include rendering profiles for each of a set of graphics object classes.

5. The method of claim 1, wherein the stored rendering profiles include a first rendering profile linked to stored features of a first class of graphics object and at least a second rendering profile linked to stored features of a second class of graphics object.

6. The method of claim 5, wherein the method includes comparing features extracted from each identified segment with the stored features of the first class and the stored features of the second class and assigning the identified segment to the class to which the closest set of stored features are linked.

7. The method of claim 1 wherein the stored rendering profiles comprise look up tables.

8. The method of claim 1, further comprising, prior to the segmenting, reducing a resolution of the image.

9. The method of claim 1, further comprising converting portions of the image which are in different color spaces to a common color space.

10. The method of claim 1, further comprising printing the print job on a color output device.

11. The method of claim 1, further comprising linking each of the stored rendering profiles to a set of features extracted from training images.

12. The method of claim 1, wherein the combining comprises restoring the segments to which the profiles have been applied to their original resolutions in the input image.

13. A non-transitory computer program product which encodes instructions which, when executed by a computer, perform the method of claim 1.

14. A printing system comprising memory which stores instructions for performing the method of claim 1 and a color output device for rendering the print job on print media.

15. A method of rendering an image comprising:
segmenting the image into a plurality of segments based on image content;
identifying segments with colors that are out-of-gamut colors for a color output device;
for each of the plurality of segments, identifying a rendering profile from a set of stored rendering profiles, the set of rendering profiles including at least a first rendering profile for applying to identified segments with out-of-gamut colors and at least a second rendering profile;
applying the rendering profiles to the respective segments, including applying the at least first rendering profile to identified segments with out-of-gamut colors; and
combining the segments to which the rendering profiles have been applied into a print job for printing the image with the color output device.

16. The method of claim 15, wherein the identifying of the rendering profile includes, for each identified segment, identifying a feature of the segment and comparing the identified feature to a set of stored features extracted from training images, each of the stored features being linked to one of the set of rendering profiles.

17. The method of claim 16, wherein the identified features are identified using nonlinear principal component analysis.

18. The method of claim 16, wherein each identified feature and the stored features are selected from the group consisting of feature vectors and feature matrices.

19. The method of claim 18, wherein the identified feature includes an identified feature vector or identified feature matrix and the stored features each include a stored feature vector or a stored feature matrix and the comparing of the identified feature includes computing a distance metric between the identified feature vector or identified feature matrix and each of the set of stored feature vectors or stored feature matrices.

20. The method of claim 19, wherein the comparing of the identified feature includes computing a weighted distance metric between the identified feature vector or identified feature matrix and each of the set of stored feature vectors or stored feature matrices.

21. A system for rendering an image comprising:
memory which stores instructions; and
a processor which executes the instructions to perform:
segmenting the image into a plurality of segments based on image content;
for each identified segment:
adjusting the resolution of the segment;
identifying a rendering profile from a set of rendering profiles, each of the rendering profiles relating input color values to output color values, comprising generating a feature vector or matrix for the segment comprising concatenating pixel colorant values of the pixels in the resolution adjusted segment, comparing the feature vector or matrix to a database of feature vectors or matrices and identifying the rendering profile from the set of rendering profiles corresponding to the closest feature vector or matrix in the database; and
applying the respective rendering profile to the respective segment; and combining the segments to which the different profiles have been applied into a print job.

22. The system of claim 21, further comprising memory which stores the set of rendering profiles accessible to the processor.

23. The system of claim 21, wherein the set of rendering profiles includes a first rendering profile associated with a first object class and at least a second rendering profile associated with a second object class, and wherein the system further includes memory which stores a first set of features linked to the first object class and a second set of features linked to the second object class.

24. A printer comprising the system of claim 21 and a color output device in communication with the system for printing the print job on print media.

25. The system of claim 21, wherein the system stores the set of the rendering profiles, the set including rendering profiles for sky, buildings, and grass.

* * * * *